(12) United States Patent
Gilbert

(10) Patent No.: US 7,023,614 B2
(45) Date of Patent: Apr. 4, 2006

(54) PORTABLE MICROSCOPE HAVING AN ILLUMINATION DEVICE, AND MICROSCOPE STAGE

(75) Inventor: Manfred Gilbert, Schoeffengrund (DE)

(73) Assignee: Leica Microsystems CMS GmbH, Westzlar (DE)

( * ) Notice: Subject to any disclaimer, the term of this patent is extended or adjusted under 35 U.S.C. 154(b) by 11 days.

(21) Appl. No.: 10/678,442

(22) Filed: Oct. 2, 2003

(65) Prior Publication Data
US 2004/0066553 A1    Apr. 8, 2004

(30) Foreign Application Priority Data
Oct. 2, 2002  (DE)  ................................ 102 46 275

(51) Int. Cl.
G02B 21/06  (2006.01)

(52) U.S. Cl. ..................................... 359/385

(58) Field of Classification Search ................ 359/382, 359/383, 385, 388, 390, 391, 392
See application file for complete search history.

(56) References Cited

U.S. PATENT DOCUMENTS

| | | | | |
|---|---|---|---|---|
| 3,941,452 A | * | 3/1976 | Parker et al. | 359/374 |
| 3,997,239 A | | 12/1976 | Scherzer | 350/84 |
| 4,361,377 A | | 11/1982 | Pullen | 350/8 |
| 4,565,427 A | * | 1/1986 | Schilling et al. | 359/392 |
| 4,652,095 A | * | 3/1987 | Mauro | 359/393 |
| 5,062,697 A | | 11/1991 | Mitchell | 359/379 |
| 5,262,891 A | * | 11/1993 | Nakasato | 359/385 |
| 5,315,080 A | * | 5/1994 | Kaczynski et al. | 200/47 |
| 5,781,338 A | * | 7/1998 | Kapitza et al. | 359/398 |
| 6,488,398 B1 | * | 12/2002 | Bloch et al. | 362/575 |
| 6,674,575 B1 | * | 1/2004 | Tandler et al. | 359/389 |

FOREIGN PATENT DOCUMENTS

EP    0 528 100 A1    2/1993

\* cited by examiner

Primary Examiner—Mark A. Robinson
Assistant Examiner—Alessandro Amari
(74) Attorney, Agent, or Firm—Simpson & Simpson, PLLC

(57) ABSTRACT

A portable microscope and a microscope stage (10) for a portable microscope are disclosed. The microscope comprises a stand (4) that carries the adjustable-height microscope stage (10). The microscope stage (10) is constructed from a sample support part (38), a guide part (40), and a base (42). The base (42) of the microscope stage (10) carries an illumination module (39).

6 Claims, 3 Drawing Sheets

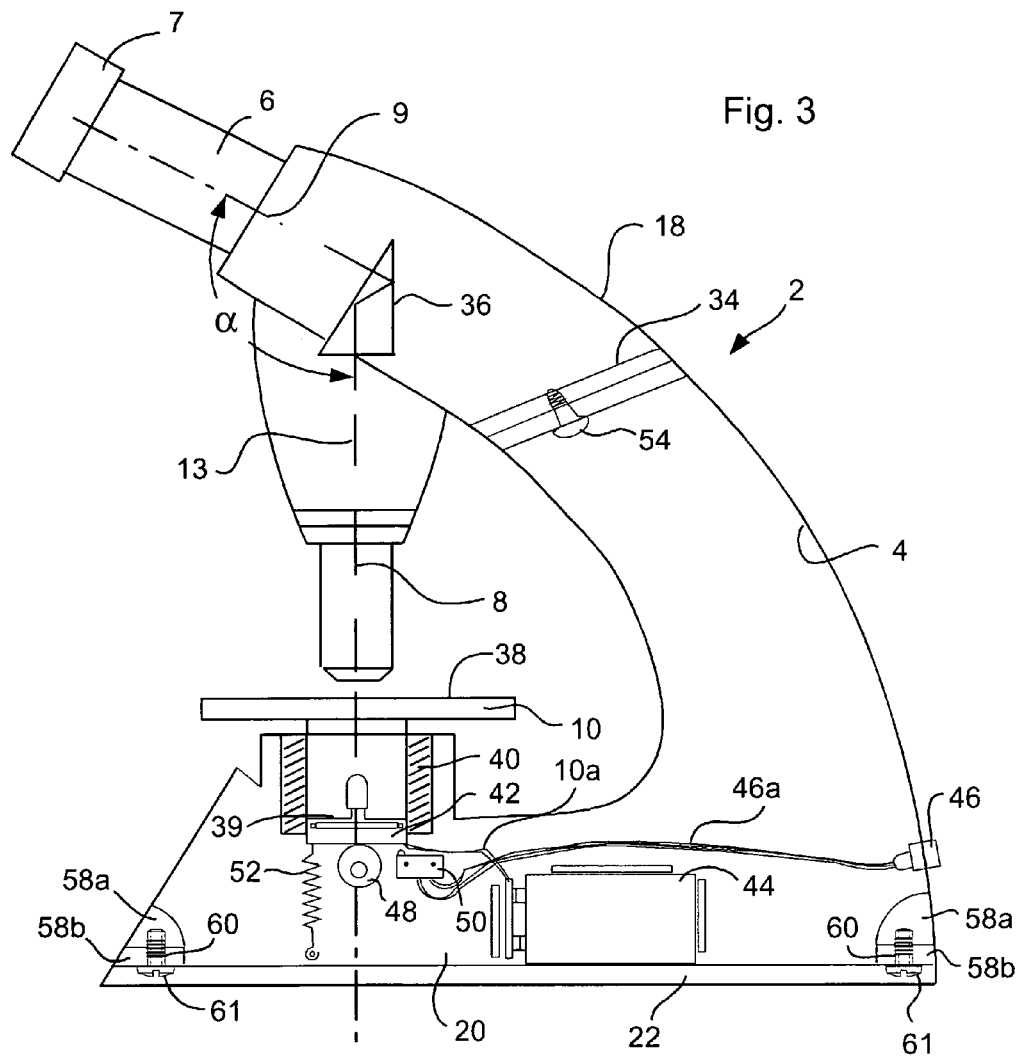

PORTABLE MICROSCOPE HAVING AN ILLUMINATION DEVICE, AND MICROSCOPE STAGE

CROSS REFERENCE TO RELATED APPLICATIONS

This application claims priority of the German patent application 102 46 275.5 which is incorporated by reference herein.

FIELD OF THE INVENTION

The invention concerns a portable microscope having an illumination device. The invention further concerns a microscope stage for a portable microscope.

BACKGROUND OF THE INVENTION

U.S. Pat. No. 3,997,239 discloses a portable microscope that is assembled from shell-shaped parts. The microscope stage is mounted on an arm, and can be displaced in the direction of the optical axis of the microscope via an eccentric cam. An artificial illumination system for the specimens on the microscope stage is not provided.

U.S. Pat. No. 4,361,377 also describes a portable and compact microscope that is equipped on the housing with a plurality of adjustment elements. The specimen to be examined is introduced through a slot in the housing. Illumination occurs via at least one conventional incandescent bulb that can be connected to a battery to supply power.

U.S. Pat. No. 5,062,697 discloses a portable microscope that is assembled from two cylindrical components. An illumination device and an energy source by means of a battery are housed in one cylindrical component. The microscope serves principally for the examination of blood samples. A switch, with which the power supply for illumination is switched on or off, projects out from the cylindrical wall.

European Patent Application EP-A-0 528 100 discloses a portable microscope that has a cylindrical shape. An opening in the housing into which a specimen slide can be inserted is opened up by means of a slider. A circuit is also closed thereby, so that the lamp provided for illumination is supplied with power.

BRIEF SUMMARY OF THE INVENTION

It is the object of the invention to create a microscope, having an artificial light source, that can be manufactured economically, has imaging properties of good quality, and reduces to a minimum the control elements on the stand of the microscope.

This object is achieved by way of a portable microscope comprising: a stand that is constructed from a first housing shell and a second housing shell; a height-adjustable microscope stage which is carried by the stand; a base part that closes the first and the second housing shell at the bottom, wherein the microscope stage has a sample support part, a guide part, and a base; and the base of the microscope stage carries an illumination module.

A further object of the invention is to create an economical microscope stage that comprises a minimum number of individual elements and is easily maintainable.

The object is achieved by way of a microscope stage comprising: a sample support part, a guide part and a base and an illumination module is carried by the base. The invention has the advantage that a portable microscope encompasses a stand which carries an adjustable-height microscope stage. The microscope stage is constructed from a sample support part, a guide part, and a base. The base of the microscope stage carries an illumination module. An external power supply, a battery, or a rechargeable battery can be provided as the energy source for the illumination module. A further advantage is that power delivery to the illumination module is interrupted when the microscope stage is lowered. The illumination module encompasses at least one light-emitting diode that emits light and is provided, together with an electronic circuit, in the region of the base of the microscope stage. The light-emitting diodes can also be designed for white light or for any other color. The use of light-emitting diodes has advantages over conventional incandescent bulbs in terms of lower energy consumption and an extended service life. In addition, the light-emitting diodes deliver almost no thermal input into the stand of the microscope. The microscope stage itself encompasses a sample support part having a transparent element and a diffusion disk that is introduced between the illumination module and the transparent element. The base, the guide part, and the sample support stage are adhesively bonded to each other. The illumination module is retained with a plastic ring that is retained between the illumination module and the base adhesively bonded to the guide part.

Further advantageous embodiments of the invention are evident from the dependent claims.

BRIEF DESCRIPTION OF THE DRAWINGS

The subject matter of the invention is depicted schematically in the drawings and will be described below with reference to the Figures, in which:

FIG. 3 is a side view of the microscope, in which one housing part is removed in order to allow a view into the interior of the stand.

DETAILED DESCRIPTION OF THE INVENTION

Figure 1:
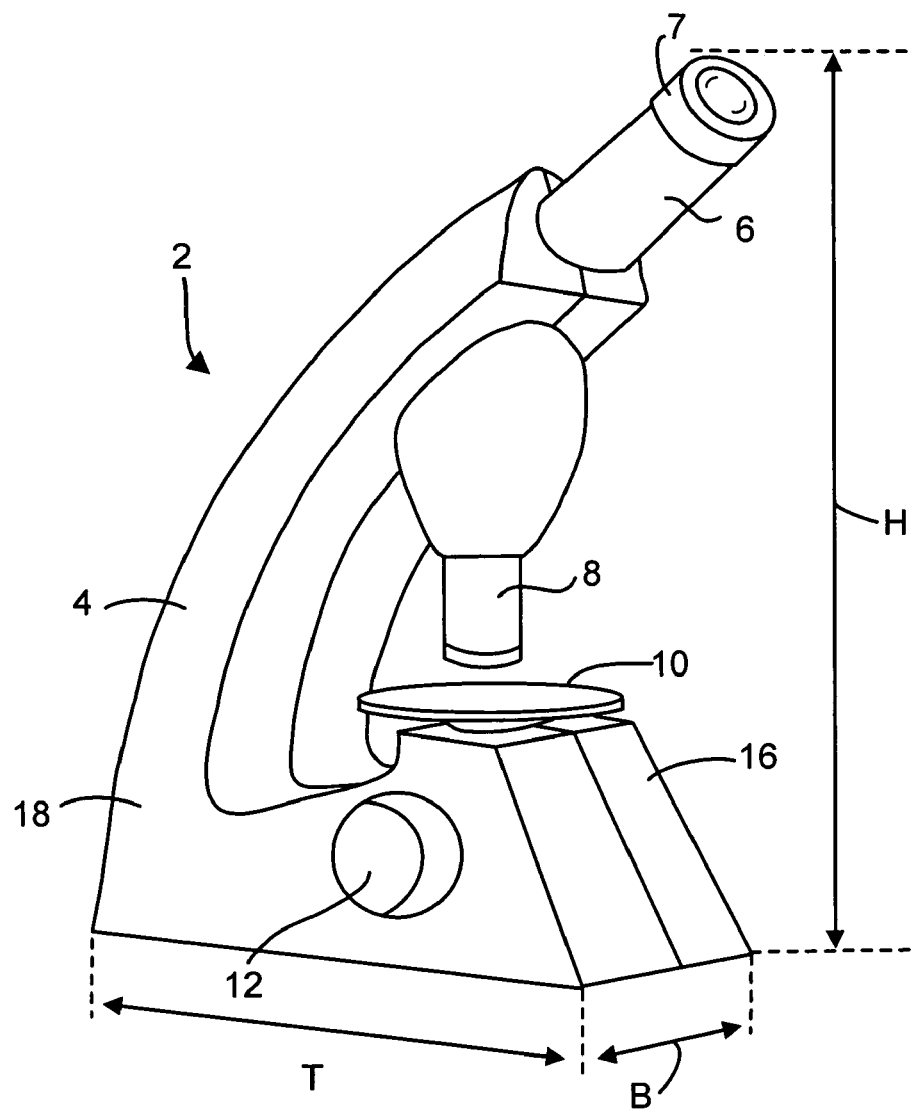
FIG. 1 is a perspective view of the microscope.

FIG. 1 depicts microscope 2 in perspective. The microscope 2 encompasses a stand 4 on which an eyepiece tube 6, at least one objective 8, and a height adjustable microscope stage 10 are provided. The at least one objective 8 defines an optical axis 13 (see FIG. 3). An eyepiece 7 is inserted into eyepiece tube 6. Eyepiece 7 likewise defines an optical axis 9. Also provided on either side of stand 4 is a respective Z-drive knob 12 with which the microscope stage 10 can be displaced vertically relative to objective 8. Microscope 2 has a height H, a width B, and a depth T which are selected so that microscope 2 can be transported in a conventional carrying case (not shown). A "conventional carrying case" is to be understood as a carrying case having a width $B_K$ of 48 cm, a height $H_K$ of 36 cm, and a depth $T_K$ of 11 cm.

Figure 2:
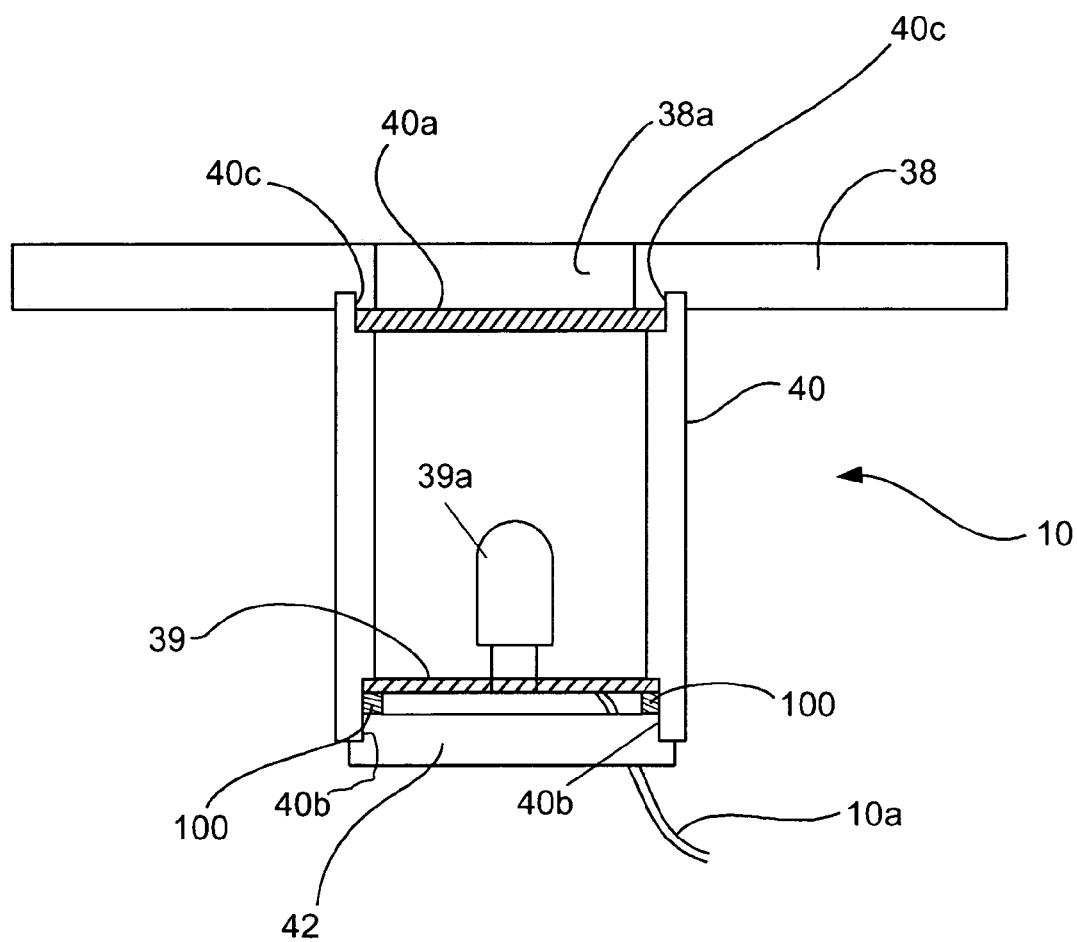
FIG. 2 is a cross section of the microscope stage, providing a view into the interior of the microscope stage.

Microscope stage 10 is depicted in detail in FIG. 2. Microscope stage 10 forms a unit, and is configured from a sample support part 38 and a cylindrical guide part 40. Cylindrical guide part 40 is closed off at one end by a base 42 and at the other end by sample support part 38. Base 42 encompasses an illumination module 39 (electronics and light source). Sample support part 38, cylindrical guide part 40, and base 42 are adhesively bonded together into one unit. This ensures simple and inexpensive final assembly of the entire microscope 2. A transparent element 38a is provided in sample support part 38. Transparent element 38a allows passage of the light generated by illumination module 39. Illumination module 39 serves to generate white light. The white light is emitted by at least one light-emitting diode 39a that is mounted on illumination module 39. Guide part 40 possesses an upper circumferential step 40c and a lower circumferential step 40b. Upper circumferential step 40c carries a diffusion disk 40a that ensures homogeneous distribution of the illumination. Upper circumferential step 40c moreover projects into sample support part 39 and is adhesively bonded in place there. Illumination module 39 rests against lower circumferential step 40b. Before base 42 is adhesively bonded to lower circumferential step 40b, a plastic ring 100 is placed between illumination module 39 and base 42. The base that is adhesively bonded to circumferential step 40b thus secures illumination module 39. A cable 10a that is connected to the power supply is guided through base 42.

FIG. 3 is a side view of microscope 2 in which one housing part is removed in order to provide a view into the interior of stand 4. Stand 4 is constructed substantially from a first and a second housing shell 16 and 18 (only the second housing shell is depicted). Stand 4 is C-shaped and rests on a stand base cover 22 that is joined to a base part 20 of stand 4. Base part 20, which is likewise constituted by first and second housing shell 16 and 18. Base part 20 is closed off by stand base cover 22. Before stand base cover 22 is mounted, first and second housing shell 16 and 18 are joined to one another using at least two joining means 34 in each case. The respective joining means 34 are arranged in the interior of first and second housing shell 16 and 18 and are immovably joined to one another by a screw 54. Screw 54 is not visible from outside stand 4, so that the external shape of stand 4 is not disturbed by any threaded connections. An optical deflection means 36 is also arranged in the interior of, for example, second housing shell 18. Optical deflection means 36 is required because optical axis 9 of eyepiece 7 inserted into eyepiece tube 6, and optical axis 13 of objective 8 which is in the working position, are arranged at an angle α. Angle α is embodied as an obtuse angle in order to achieve an ergonomic viewing position for the user. Optical deflection means 36 is embodied in such a way that the user sees an image of the sample which has the same orientation as the sample itself. Objective 8 can be embodied as a single objective. Objective 8 can likewise be mounted on a turret (not depicted), offering the user the capability of switching rapidly between different magnifications. Microscope stage 10 is provided opposite base part 20. A battery 44, which serves to supply power to illumination module 39, is housed in base part 20 of stand 4. As an inexpensive embodiment, a controller (not depicted) for the light intensity of illumination module 39 can be provided. The controller can be easily be embodied by way of a potentiometer. Illumination module 39 of microscope 2 encompasses at least one white LED 39a. Battery 44 can likewise be embodied in the form of a rechargeable battery. In another embodiment of microscope 2, a connection socket 46 for an external power supply can also be provided. A cable 46a connects connection socket 46 to an on/off switch 50. The Z-drive knob 12 is mechanically connected to an eccentric cam 48, wherein the stage can be displaced vertically relative to objective 8 using Z-drive knob 12 (FIG. 1).

Connected to the interior of housing shell 18 and to base 42 of microscope stage 10 is an elastic element 52 which represents for microscope stage 10 a return force that returns microscope stage 10 to an initial position when lowered using the cam. In addition, on/off switch 50 is mounted in such a way that it is actuated by the lowering or raising of microscope stage 10. Power delivery to illumination module 39 is interrupted or effected by way of on/off switch 50. Elastic element 52 can be configured in the form of a helical spring or a rubber band.

Also provided at the edges of first and second housing shell 16 and 18 are positioning elements 58a and 58b that make possible alignment of first and second housing shells 16 and 18. First and second housing shell 16 and 18 each form, at the inner edge of base part 20, multiple threaded openings 60 that line up with holes (not depicted) in stand base cover 22. Screws 61 are threaded through the holes in stand base cover 22 into threaded openings 60 in order to attach base 22 to first and to second housing shell 16 and 18.

What is claimed is:

1. A portable microscope comprising: a stand that is constructed from a first housing shell and a second housing shell; a height-adjustable microscope stage which is carried by the stand; a base part that closes the first and the second housing shell at the bottom, wherein the microscope stage forms a unit from a sample support part, a cylindrical guide part, and a base; the base of the microscope stage carries an illumination module; and wherein the sample support part, the cylindrical guide part, and base are adhesively bonded together into the unit, an energy source is provided in the base part of the stand, the energy source being a battery or rechargeable battery, and an on/off switch is associated with the microscope stage in such a way that when the microscope stage is lowered, delivery of power from the energy source to the illumination module is interrupted; and when the microscope stage is raised, delivery of power from the energy source to the illumination module is effected.

2. A portable microscope comprising: a stand that is constructed from a first housing shell and a second housing shell; a height-adjustable microscope stage which is carried by the stand; a base part that closes the first and the second housing shell at the bottom, wherein the microscope stage forms a unit from a sample support part, a cylindrical guide part, and a base; the base of the microscope stage carries an illumination module; and wherein the sample support part, the cylindrical guide part, and base are adhesively bonded together into the unit, and the microscope stage is operatively arranged to be partially inserted into the stand as defined by the first and the second housing shell, and the cylindrical guide part of the microscope stage slides inside the stand.

3. The portable microscope as defined in claim 2, wherein an elastic element, which exerts a return force on the microscope stage in order to pull the microscope stage into the stand, is joined to the base of the microscope stage and to the stand.

4. A microscope stage for a portable microscope, comprising: a sample support part, a cylindrical guide part and a base and an illumination module is carried by the base and wherein the sample support part, the cylindrical guide part, and base are adhesively bonded together into a unit, and an on/off switch is associated with the microscope stage in such a way that when the microscope stage is lowered, delivery of power from an energy source to the illumination module is interrupted; and when the microscope stage is raised, delivery of power from the energy source to the illumination module is effected.

5. The microscope stage as defined in claim 4, wherein the energy source is a battery or rechargeable battery.

6. A microscope stage for a portable microscope, comprising: a sample support part, a cylindrical guide part and a base and an illumination module is carried by the base and wherein the sample support part, the cylindrical guide part, and base are adhesively bonded together into a unit, and the illumination module is a preassembled component and the base, the cylindrical guide part, and the sample support part are adhesively bonded to one another; and the illumination module is retained in the guide part with a plastic ring and by means of the base adhesively bonded to the cylindrical guide part.

\* \* \* \* \*